March 27, 1928.
E. VOLLRATH
BELT STRETCHER
Filed Jan. 31, 1927
1,663,783
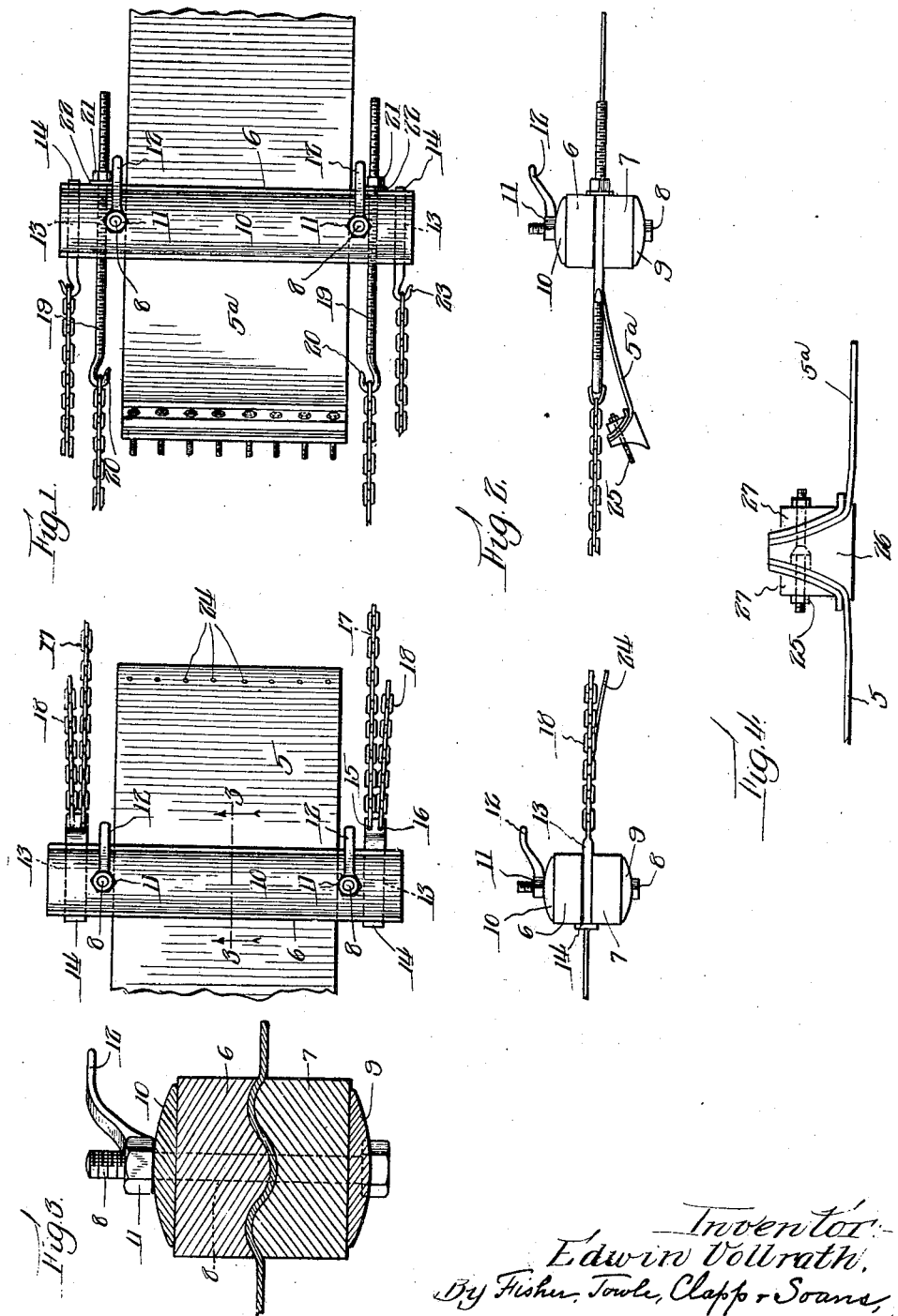
Inventor:
Edwin Vollrath,
By Fisher, Towle, Clapp & Soans,
attys.

Patented Mar. 27, 1928.

1,663,783

UNITED STATES PATENT OFFICE.

EDWIN VOLLRATH, OF EASTON, PENNSYLVANIA.

BELT STRETCHER.

Application filed January 31, 1927. Serial No. 164,785.

This invention relates to improvements in devices for stretching belts after they have been put on pulleys to bring the ends together so that belt fastenings may be applied. The invention can be used to advantage on ordinary belts where the pulleys are relatively close together for the transmission of power, but the invention finds its greatest application and advantage in cases where the belts are of considerable length, as in the case of conveyor belts, which sometimes exceed a thousand feet in length, and wherein, after being stretched as much as possible by hand, the ends to be united may still be many feet apart.

Heretofore it has been the custom, for bringing together the ends of the belt, to employ two clamps on the belt ends with long screws connecting them, the screws being formed with right and left threads for drawing two clamps together, but even this cumbersome means has too short a range of motion to take up more than five or six feet, whereas it is frequently necessary to use some form of power through a range of twenty feet or more.

The present invention provides a means of unlimited range and of sufficient power to stretch a large belt.

The novel structural features of the invention, its mode of use and the advantages inhering therein will be readily understood by persons skilled in the art from the following detailed description, taken in connection with the accompanying drawing in which I have illustrated one practical and approved embodiment of the invention, and wherein—

Fig. 1 is a plan view showing two separated belt ends with my improved stretching device applied thereto;

Fig. 2 is an edge elevation, viewed from the bottom of Fig. 1;

Fig. 3 is an enlarged vertical cross-section through one of the clamps, on the line 3—3 of Fig. 1;

Fig. 4 is an edge elevation showing the belt ends brought together and united.

Referring to the drawings, 5 and 5ª designate the two belt ends that are to be drawn together and joined. Applied to each belt end is a clamp, consisting of upper and lower bars 6 and 7 applied respectively crosswise of the upper and lower surfaces of the belt end. The clamp bars are united by through bolts 8 just outside the longitudinal edges of the belt ends, and the opposed clamping surfaces of the bars 6 and 7 are preferably crimped or corrugated, as shown in Fig. 3, to effect a more perfect grip on the belt and avoid slipping of the latter through the clamp. Preferably the lower member 7 of the clamp is equipped with a heavy reinforcing washer plate 9 approximately the full width of the clamp to distribute the stress across the width of the clamp, this washer plate being countersunk to receive the head of the screw 8; and the upper half 6 of the clamp is similarly equipped with a light reinforcing washer plate 10 against which bears the nut 11 of the bolt 8 which may conveniently be formed with a handle 12 for turning the same.

The end portions of the clamp bars 6 and 7 are sufficiently reduced in thickness to provide space for the insertion therebetween of flat steel bars 13 each having a T-head 14 bearing against the rear edges of the clamp bars. In the case of the steel bars 13 applied to the clamp on the belt end 5, the other ends of said steel bars are formed with holes 15 and 16 in which are attached two long chains 17 and 18 respectively. Slidable between the members of the other clamp which is applied to the belt end 5ª are a pair of long screws 19 formed on their inner ends with hooks 20 that are adapted to engage with the chains 17, and equipped with nuts 21 and washers 22 bearing against the outer side of the clamp. The inner ends of the T-bars 13 of this clamp are formed with hooks 23 adapted to engage with the chains 18.

In operating the device, the two chains 17 are first hooked over the hooks 20 with as much tension as may be conveniently obtainable, and the nuts 21 are then turned on the screws 19 until the entire length of the screw has been drawn into the clamp. The chains 18 are then pulled up tight and attached to the hooks 23, after which the nuts 21 are screwed back on the screws 19 until the full length of the screws 19 is extended toward the opposing clamp. The two chains 17 are then attached at a new point to the hooks 20 with the length of the screw movement taken up, and the nuts 21 are again turned to pull the screws 19 through the clamp, after which the slack from the chains 18 is again taken up by reattaching said chains at a new point to the hooks 23. These operations are continued until the ends of the belt are brought together, whereupon they are united by any suitable or convenient fastening device. In the drawing I have shown the two belt ends formed with a row of spaced holes 24 adapted to receive connecting bolts 25 passed therethrough when the two ends of the belt are bent up to bring the holes into register. Preferably and as shown best in Fig. 4 I employ between the upwardly bent apertured ends of the belt a transverse A-shaped filler block 26 apertured for the passage of the bolts 25, and, on the outer sides of the belt ends transverse clamp bars 27 also apertured to receive the bolts 25. No claim, however, is made to the last described joint connector herein, as the same forms the subject-matter of Letters Patent No. 1,643,037 granted to me September 20, 1927.

So far as I am aware, in all previous clamps employed for the purpose of drawing together the belt ends, such clamps have been formed with flat inner faces, and as these clamps pressed against only the outside plies of a belt, the inner plies received less tension, with the result that the ply belt structure was permanently injured at the point where the clamps were applied. By giving to the inner faces of the clamp bars the crimped or corrugated form shown in Fig. 3, a grip is provided which will distribute the stress to the inner plies of the belt and avoid the injury to the latter above referred to.

I claim—

1. In a belt stretcher of the character described, the combination with clamps and means for applying them to the respective belt ends, of means for drawing said clamps together by successive steps, and means independent of said drawing means for holding said clamps in successive positions of approach.

2. In a belt stretcher of the character described, the combination with a pair of clamps applied respectively to the ends of a belt, of means carried by and extending between said clamps for drawing the belt ends together by successive steps, and other means carried by and extending between the clamps for holding the latter in tension between successive adjustments of said first-named means.

3. In a belt stretcher of the character described, the combination with a pair of clamp bars applied respectively to the ends of a belt, of two pairs of chains connected respectively to the ends of one of said clamp bars, take-up screws mounted in the other clamp bar engageable with one chain of each pair respectively, and anchor hooks also mounted in said other clamp bar engageable with the other chain of each pair, respectively, to hold said clamp bars in tension during successive readjustments of said take-up screws with said first-named chains.

4. In a belt stretcher of the character described, the combination with a pair of clamp bars applied respectively to the ends of a belt, of anchor bars extending through the end portions of said clamp bars and formed on their outer ends with heads engaging the outer edges of said clamp bars and on their inner ends with chain-attaching means, two pairs of chains attached to the inner ends of the anchor bars carried by one of said clamp bars, and take-up screws mounted in the other clamp bar equipped with nuts for drawing said screws through said clamp bar and with hooks for engaging one pair of said chains.

5. A belt clamp comprising two pairs of bars adapted to grip the two ends of a belt respectively, said bars being formed with crimped belt-engaging faces, and means for clamping said bars on said belt ends, in combination with a device for drawing said pairs toward each other, and independent means for holding said pairs in successive stages of approach.

EDWIN VOLLRATH.